June 3, 1952     S. J. POPEIL     2,599,012
DOUGHNUT MAKER
Filed Dec. 9, 1949
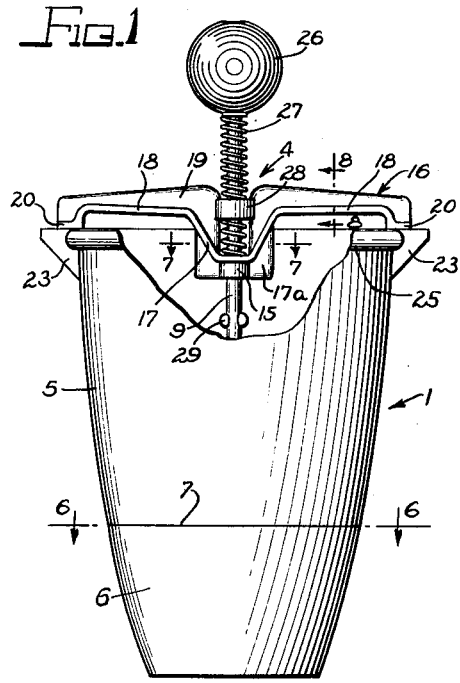
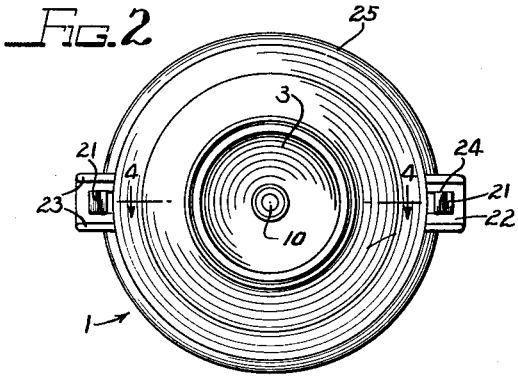
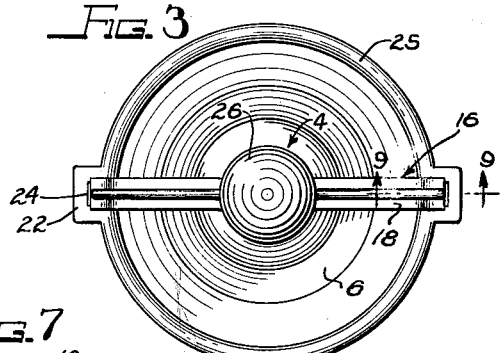
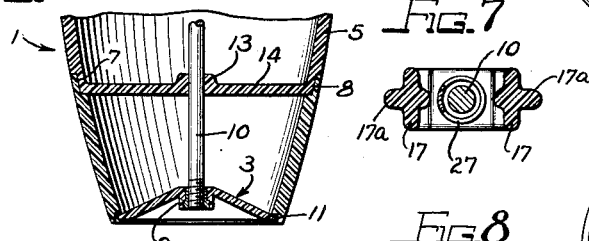
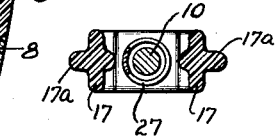
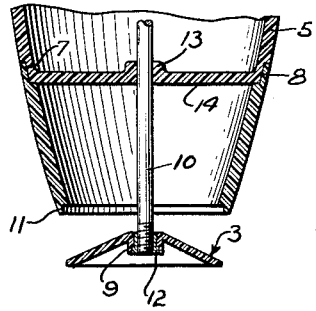
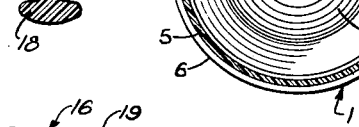
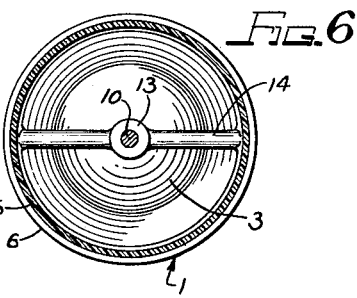
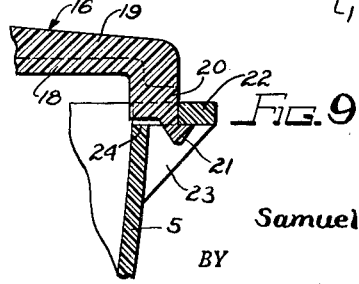
INVENTOR.
Samuel J. Popeil
BY
Carlson, Pitzner, Hubbard & Wolfe
Attys.

Patented June 3, 1952

2,599,012

UNITED STATES PATENT OFFICE 2,599,012

DOUGHNUT MAKER

Samuel J. Popeil, Chicago, Ill., assignor to Popeil Bros., Inc., Chicago, Ill., a corporation of Illinois Application December 9, 1949, Serial No. 132,064

9 Claims. (Cl. 107—14)

The present invention relates to improvements in devices for making doughnuts, and has particular reference to such devices of a character adapted for home use.

One of the objects of the present invention is to provide a doughnut maker adapted to be filled with a batch of dough, and operable to form and dispense dough blanks in annular shape ready to be dropped into the frying fat.

Another object is to provide a doughnut maker of the foregoing character which is simple and inexpensive in construction, and which is convenient and reliable in operation.

A further object is to provide a doughnut maker having comparatively few parts, and a simple cut-off valve arrangement automatically operable to sever the dough as it exudes in annular form through the force of gravity.

Other objects and advantages will become apparent as the description proceeds.

In the accompanying drawing:

Figure 1 is a side elevational view of a doughnut maker embodying the features of the present invention, a fragmentary portion of the top rim being broken away.

Fig. 2 is a bottom end view.

Fig. 3 is a top end view.

Fig. 4 is a fragmentary vertical sectional view taken in the plane of line 4—4 of Fig. 2, and showing the cut-off valve in closed position.

Fig. 5 is a view similar to Fig. 4, but showing the cut-off valve in open position.

Fig. 6 is a transverse sectional view taken along line 6—6 of Fig. 1.

Figs. 7, 8 and 9 are fragmentary detail sectional views taken, respectively, along lines 7—7, 8—8 and 9—9 of Figs. 1 and 3.

Referring more particularly to the drawing, the doughnut maker, constituting the exemplary embodiment of the invention comprises a receptacle 1 adapted to receive a batch of the doughnut dough, and having a circular bottom outlet normally closed by a central cut-off valve member 3, and actuating means, indicated generally at 4, for moving the member 3 into open position, and normally operative to maintain said member in closed position. When the valve member 3 is in open position it serves to define, with the marginal edge of the outlet, an annular opening through which the dough is exuded as an annular bead. If, after exudation of the desired amount of dough, the valve member 3 is released for movement into closed position, it will coact with the edge of the outlet, to sever or cut-off the exuded annular bead of dough and cause the same to drop into the frying bath of hot fat.

The receptacle 1 may be of any suitable size and shape through which the dough, introduced at the top, will flow downwardly under the force of gravity, smoothly to the outlet. In the preferred construction, the receptacle 1 comprises substantially a downwardly tapered tube with a smooth interior. Although generally frusto-conical, the side wall of the tubular receptacle 1 is slightly curved or externally convex longitudinally of the central axis so that the angle of taper increases progressively from top to bottom. In short, the receptacle 1 is substantially cylindrical in form near the top, and the side wall curves progressively inwardly and downwardly toward the lower end.

Preferably the receptacle 1 is made of two body parts, namely a relatively large tube portion 5 and a relatively small bottom end portion 6, thus facilitating the molding of those parts out of a suitable material, such as a form sustaining but slightly flexible plastic. Polystyrene is a very satisfactory plastic material for this purpose but other materials of suitable physical qualities may be used if desired. To join the body portions rigidly together into a unitary structure, the lower marginal edge of the upper portion 5 is formed with an external peripheral notch 7 of a radial depth equal approximately to one-half of the wall thickness, and the upper marginal edge of the lower portion 6 is formed with a complemental internal peripheral notch 8 of the same depth and adapted to interfit snugly with the first mentioned notch.

The adjoining peripheral edge sections of the body portions 5 and 6 thus are interfitted telescopically and secured together by a suitable adhesive or heat juncture. The margins of the notches 7 and 8 are formed with sharp edges or corners so that the juncture is flush both interiorly and exteriorly. In the preferred form, the upper body portion is made of clear transparent plastic material, and the lower body portion is made of red plastic.

The cut-off valve member 3 comprises a disk of suitable shape, and is shown as internally conical in form, preferably at a cone angle of approximately 25° relative to the plane of the disk, so as to facilitate downward flow and exudation of the dough. At the axial center, the valve disk 3 is formed with a depending bearing sleeve 9 opening therethrough to receive the lower end of a vertical actuating stem 10 constituting part of the actuating means 4. While the valve disk 3 may be made of any suitable material, it is preferably molded also of red plastic material, polystyrene, for example, like that of the lower body portion 6.

The cut-off valve is constructed so as to have a shearing action tending to sever the exuded annulus of dough sharply and cleanly as the valve disk 3 is moved or permitted to move into closed position. To this end, the lower marginal edge section of the body portion 6 is formed with an inner peripheral notch or cylindrical counterbore having a cylindrical side surface extending inwardly to an annular bottom surface to define a valve seat 11 adapted snugly to receive the peripheral edge of the valve disk 3. The latter edge is of appreciable width and cylindrical in shape and formed with sharp or abrupt corners.

Considering now the valve actuating means 4, the stem 10, which may be made of metal, is provided in the form of a cylindrical rod, and is suitably anchored in position by means of a metal bushing 12 rigidly confined in the sleeve 9 and adjustably threaded on to the lower end of the rod. An intermediate guide bearing 13 is provided for the rod 10 within the receptacle 1, and is constructed so as to interpose but a minimum impediment to the normal downward gravity flow of the dough. More particularly, the lower end of the upper body portion 5 is formed integrally with a narrow diametrical crossbar 14 which is thickened at the center and formed with an axial bore to define the bearing 13. Preferably, the thickening is on the top surface and is conical in external shape to facilitate flow of the dough thereabout.

Constructing the receptacle 1 of two body portions with the juncture in the plane of the crossbar 14 permits these parts to be plastic molded since the bar can be located in one face of the mold and the parts can be provided with proper draft to permit removal from the mold.

A second guide bearing is provided for the stem or rod 10 at the top of the receptacle 1. In this instance, the bearing comprises a sleeve 15 through which the rod extends, and which is formed at the center of a bridge member 16 adapted to be removably secured to the top of the receptacle 1. The bridge member 16, when in position, extends diametrically across the open end of the receptacle 1, into which the dough is placed.

In the preferred form, the bridge member 16 consists of a central truncated V-shaped depressed portion 17 formed with the guide sleeve 15 and side ribs 17a on the underside, and of two straight arms 18 at opposite sides of the depressed portion and formed with longitudinal ribs 19 along the top, these arms having depending mounting pads or feet 20 at their outer ends and suitable outwardly-offset hook elements 21 adapted for interlocking engagement with keeper elements 22 on the top edge of the receptacle 1. The keeper elements 22 consist of flat lugs which are located at diametrically opposite points and project externally from the top edge of the receptacle 1. They are flat and flush with the top plane of the receptacle 1, and are reinforced on the underside by spaced parallel triangular webs 23 integral therewith. They are formed respectively with rectangular slots 24 opening therethrough between the webs 23 and also to the interior of the receptacle wall. Preferably, an external peripheral rib or bead 25 is formed along the marginal edge of the receptacle 1 between the lugs 22. The pads or feet 20 of the bridge member 16 are adapted to rest in face engagement on the lugs 22, and the hook elements 21 are adapted to enter the slots 24 and to engage under the outermost edges thereof, whereby to retain the bridge member securely in position.

Although the receptacle 1 is made of substantially rigid or solid plastic material, the material has a limited degree of flexibility and may be temporarily distorted sufficiently to permit interlocking engagement of the bridge member 16 and the keeper lugs 22. Thus, by compressing the top of the receptacle 1 transversely of the medial line between the lugs 22 into an oval shape, the lugs will be separated on the major axis sufficiently to permit insertion of the hook elements 21 into the slots 24. Then, upon releasing the receptacle 1, it will reassume its normal circular shape at the top rim, and, as a result, the hook elements will engage underneath the lugs 22 to lock the bridge member 16 in position.

The stem or rod 10 is provided at the top end with a suitable hand actuating knob 26. A coil compression spring 27 encircles the rod 10 within the depressed portion 17 of the bridge member 16, and rests at its lower end against the top of the sleeve 15. The upper end of the spring 27 acts against the knob 26, and hence tends to bias the cut-off valve disk 3 toward and into closed position where it normally maintains the latter. Preferably a tie member 28 is formed integral with the adjacent ends of the arms 18, and is curved about one side of the rod 10 and spring 27 so as to reinforce the depressed portion 17.

The bridge member 16 may be made of any suitable material, and in the present instance is molded in one integral structure of the same type of red plastic material as the lower portion 6 of the receptacle.

Suitable lugs 29 upset from opposite sides of the rod 10 serve to limit upward movement of the latter when the valve disk 3 is removed. Adjustment of the latter on the rod 10 affords a means for adjusting the tension of the spring 27.

The operation of the doughnut maker will be evident from the foregoing description. Briefly reviewed, the doughnut dough is placed in the receptacle. Then the hand knob 26 is depressed to open the cut-off valve 3. Thereupon, the dough flows downwardly by force of gravity, and causes the lowermost portion thereof to exude through the annular valve opening about the valve disk. When the protruding bead of exuded dough has attained the desired size, the knob 26 is released, and as a result the spring 27 retracts the valve disk into closed position. In the closing movement, the peripheral edge of the valve disk 3 coacts with the valve seat 11 to shear or pinch off the exuded annulus of dough, and finally enters and engages the seat to close the valve outlet. The severed dough is of course free to drop directly into the bath of hot fat. The foregoing operation is repeated to form, sever and drop one annulus of dough after another until the supply in the receptacle is exhausted.

It will be evident that I have provided a new and improved doughnut maker which is effective in use, and simple and inexpensive in construction. The doughnut maker comprises relatively few parts, and these are simple to produce and assemble. Only the valve disk 3 and its actuating means are movable in normal use. If more closing pressure is desired in any particular instance, than that afforded by the spring 27, it may be obtained merely by pulling upwardly on the hand knob 26.

I claim as my invention:

1. A doughnut maker comprising, in combination, a receptacle adapted to receive a batch of dough through one end and converging in cross-sectional area from said one end progressively and smoothly toward the other end, said other end having a circular discharge opening the marginal edge of which defines a valve seat, a coaxial circular cut-off valve disk mounted for movement axially into and out of coacting engagement with said seat and adapted when engaged therewith to close said opening and when out of engagement therewith to define therewith an annular valve outlet through which an annulus of dough will exude by force of gravity to form an incipient doughnut blank, a stem secured to said disk and extending axially therefrom upwardly through said receptacle, a diametrical bridge member extending across the top of said receptacle and formed with a slip bearing through which said stem slidably extends, said member being disengageably connected at opposite ends to said receptacle by interlocking connections, said receptacle being made of material subject to resilient distortion laterally of said bridge member to elongate the transverse form longitudinally of said member for effecting said connections, and spring means seated against said bridge member and acting on said stem in a direction to move said disk into closed position.

2. A doughnut maker according to claim 1 in which the first mentioned end of said receptacle has a circular rim and is formed with external diametrically opposite lugs having slots opening therethrough, and said bridge member has on opposite ends pads adapted to be seated on said lugs and offset outwardly-projecting tongues adapted to be extended through said slots for interlocking engagement with the undersides of said lugs, said rim being resiliently deformable into oval shape to facilitate selective connection and disconnection of said lugs and tongues.

3. A doughnut maker according to claim 1 in which said bridge member has a central depression formed with said bearing, and said spring means comprises a coil compression spring encircling said stem within said depression and seated at one end against the top of said bearing, and said stem has a hand knob coacting with the other end of said spring.

4. A doughnut maker comprising, in combination, a receptacle adapted to receive a batch of dough through one end and converging in cross-sectional area from said one end progressively and smoothly toward the other end, said other end having a circular discharge opening the marginal edge of which defines a valve seat, a coaxial circular cut-off valve disk having a generally conical upper face mounted for movement axially into and out of coacting engagement with said seat and adapted when engaged therewith to close said opening and when out of engagement with said seat to define therewith an annular valve outlet through which an annulus of dough will exude by force of gravity to form an incipient doughnut blank, and means operable at will for effecting movement of said disk into closed position whereby to sever and drop said incipient blank.

5. A gravity feed doughnut maker comprising, in combination, a hollow receptacle of substantially inverted frustoconical shape having a filling opening at its upper end for receiving dough and a discharge opening at its lower end, said receptacle having a side wall presenting a smooth unbroken inner configuration tapering progressively from the filling opening to the discharge opening, a valve disk disposed in coaxial relation with the discharge opening and having a generally conical face defining a valve closure for the discharge opening, said valve disk being mounted for axial movement away from the discharge opening to define therewith an annular valve outlet through which an annulus of dough will be exuded by force of gravity to form an incipient doughnut blank, a manually operable actuating stem rigidly connected to said disk and extending axially and upwardly through said receptacle, a guide fixed to said receptacle for slidably supporting said stem, and a valve spring mounted for reaction between said guide and said stem and disposed for bias of said valve disk toward a normally closed position, whereby upon release of said stem said valve disk will be moved into closed position to sever and drop the doughnut blank.

6. A gravity feed doughnut maker comprising, in combination, a hollow receptacle substantially of inverted frustoconical shape having a filling opening at its upper end and a discharge opening at its lower end, said receptacle having an inner configuration in the form of an unbroken surface of revolution decreasing progressively in diameter from the filling opening to the discharge opening, a valve disk disposed in coaxial relation with the discharge opening and having a substantially conical face defining a valve closure for the discharge opening, a manually operable actuating stem rigidly connected to said disk and extending axially and upwardly through said receptacle, a lower guide bearing for said stem fixed to said receptacle intermediate the ends thereof, an upper guide bearing for said stem fixed to said receptacle at the upper end thereof, and a valve spring mounted for reaction between said upper guide bearing and said stem for maintaining said valve in normally closed position.

7. A manually actuated gravity feed doughnut maker for household use and comprising, in combination, a hollow open-ended body defining a receptacle having a filling opening at its upper end and a discharge opening at its lower end, a valve disk having an upwardly inclined annular top face defining a closure for the discharge opening, a manually operable actuating stem fixed to said valve disk and extending axially and upwardly of said receptacle, an upper portion of said body of substantially inverted frustoconical form having a progressively tapering inner configuration, a lower portion of said body of substantially inverted frustoconical form also having a progressively tapering inner configuration, the inner configuration of both said body portions being defined by a common unbroken surface of revolution, said upper and lower body portions being joined together by an internally smooth circumferential juncture, a relatively narrow diametrical cross member integral with said upper body portion and located substantially in the plane of said juncture, said cross member being formed with a central slip bearing through which said stem slidably extends, and a biasing spring mounted for reaction between said body and said stem and disposed to urge said valve disk into closed position.

8. A manually actuated gravity feed doughnut maker comprising, in combination, a hollow open-ended body having a filling opening at its upper end and a discharge opening at its lower end, said discharge opening having a marginal area including a grooved valve seat, a valve disk having a substantially conical face defining a closure for the discharge opening, the cone angle of said face being approximately 25° with the plane of said disk, an actuating stem fixed to said valve disk and extending axially and upwardly of said body, a transverse bridge fixed across the upper end of said body, said bridge having a centrally depressed portion defining a slip bearing for said stem, a substantially inverted frustoconical upper portion of said body having a progressively tapering inner configuration, a substantially inverted frustoconical lower portion of said body also having a progressively tapering inner configuration, the inner configuration of both said body portions being defined by a common unbroken surface of revolution having an angle of taper increasing progressively from the filling opening toward the discharge opening, said upper and lower body portions being joined together by an internally smooth circumferential juncture, a relatively narrow diametrical cross member integral with said upper body portion and located substantially in the plane of said juncture, said cross member being formed with a central slip bearing through which said stem slidably extends, a biasing spring mounted for reaction between said bridge and said stem and disposed to urge said valve disk into closed position, and a manual actuating element on said stem for displacing the same in opposition to said biasing spring to shift said valve disk into open position.

9. A gravity feed doughnut maker comprising, in combination, an open ended tubular receptacle having a filling opening at its upper end for receiving a batch of dough, the inner configuration of said receptacle converging in cross sectional area from its extreme upper end smoothly and continuously to its extreme lower end, said lower end having a circular discharge opening the marginal edge of which defines a valve seat, a coaxial circular cut-off valve disk mounted for movement axially into and out of coacting engagement with said seat and adapted when engaged therewith to close said opening and when out of engagement therewith to define therewith an annular valve outlet through which an annulus of dough will exude by force of gravity to form an incipient doughnut blank, a stem secured to said disk and extending axially therefrom upwardly through said receptacle, a diametrical bridge member extending across the top of said receptacle and formed with a slip bearing through which said stem slidably extends, said member being secured at opposite ends to said receptacle by interlocking connections, said receptacle being made of material subject to resilient distortion laterally of said bridge member to elongate the transverse form longitudinally of said member for effecting said connections, and spring means seated against said bridge member and acting on said stem in a direction to move said disk into closed position.

SAMUEL J. POPEIL.

REFERENCES CITED

The following references are of record in the file of this patent:

UNITED STATES PATENTS

| Number | Name | Date |
|---|---|---|
| Re. 16,143 | Lindsey | Aug. 18, 1925 |
| 1,286,236 | Conway | Dec. 3, 1918 |
| 1,416,735 | Morris | May 23, 1922 |
| 2,175,543 | Valle | Oct. 10, 1939 |
| 2,447,182 | Hutchison | Aug. 17, 1948 |
| 2,507,254 | Jones | May 9, 1950 |